(12) United States Patent
Hu et al.

(10) Patent No.: US 9,607,331 B2
(45) Date of Patent: *Mar. 28, 2017

(54) NEAR-DUPLICATE FILTERING IN SEARCH ENGINE RESULT PAGE OF AN ONLINE SHOPPING SYSTEM

(71) Applicant: GOOGLE INC., Mountain View, CA (US)

(72) Inventors: Liang Hu, Pudong New Area (CN); Lijie Chen, Pudong New Area (CN); Hao Zhang, Pudong New Area (CN)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/134,240

(22) Filed: Apr. 20, 2016

(65) Prior Publication Data

US 2016/0232591 A1 Aug. 11, 2016

Related U.S. Application Data

(63) Continuation of application No. 14/032,191, filed on Sep. 19, 2013, now Pat. No. 9,342,849, which is a
(Continued)

(51) Int. Cl.
*G06F 17/30* (2006.01)
*G06Q 30/06* (2012.01)

(52) U.S. Cl.
CPC ..... *G06Q 30/0625* (2013.01); *G06F 17/3056* (2013.01); *G06F 17/30598* (2013.01);
(Continued)

(58) Field of Classification Search
CPC ..... G06F 17/30; G06F 3/0641; G06F 17/3015
See application file for complete search history.

(56) References Cited

U.S. PATENT DOCUMENTS 6,615,209 B1 9/2003 Gomes et al.
7,016,864 B1 3/2006 Notz et al.
(Continued)

FOREIGN PATENT DOCUMENTS

CN 102411591 A 4/2012
CN 102663058 A 9/2012
(Continued)

OTHER PUBLICATIONS

A Tiny Tribe LLC, "Moodboard for iPad on the iTunes App Store", retrieved from web on Aug. 16, 2011, 2 pages.
(Continued)

*Primary Examiner* — Yuk Ting Choi
(74) *Attorney, Agent, or Firm* — Johnson, Marcou & Isaacs, LLC

(57) ABSTRACT

Reducing near-duplicate entries in online shopping system search results. For each pair of entries in a set of entries, each entry characterizing a product in a data store of an online shopping system and each entry characterized by a set of attributes, determining a distance between the entries in the pair based on the attributes. Determining entry clusters from a graph formed with each determined distance as an edge between nodes representing the entries used to determine the distance, each entry cluster identified by cluster identifier. Returning an ordered list of results responsive to the query from the data store of an online shopping system, filtered as a function of at least one of the distance and the cluster identifier.

21 Claims, 10 Drawing Sheets

Related U.S. Application Data continuation of application No. PCT/CN2013/080631, filed on Aug. 1, 2013.

(52) U.S. Cl.
CPC .. *G06F 17/30867* (2013.01); *G06F 17/30991* (2013.01); *G06Q 30/0635* (2013.01)

(56) References Cited

U.S. PATENT DOCUMENTS

| | | | |
|---|---|---|---|
| 7,197,479 | B1 | 3/2007 | Franciscus de Heer et al. |
| 7,681,120 | B2 | 3/2010 | Kikuchi |
| 7,725,363 | B2 | 5/2010 | Speers et al. |
| 7,734,569 | B2* | 6/2010 | Martin ............ G06F 17/30867 707/999.005 |
| 7,966,291 | B1 | 6/2011 | Petrovic et al. |
| 8,005,842 | B1 | 8/2011 | Pasca et al. |
| 8,051,112 | B2 | 11/2011 | Evanitsky |
| 8,214,335 | B2 | 7/2012 | Hamilton, II et al. |
| 9,342,849 | B2 | 5/2016 | Hu et al. |
| 2001/0034740 | A1 | 10/2001 | Kerne |
| 2004/0113945 | A1 | 6/2004 | Park et al. |
| 2004/0143600 | A1 | 7/2004 | Musgrove et al. |
| 2004/0205498 | A1 | 10/2004 | Miller |
| 2005/0131770 | A1* | 6/2005 | Agrawal ............ G06Q 30/0201 705/7.29 |
| 2005/0198354 | A1 | 9/2005 | Holloway, Jr. |
| 2005/0246240 | A1 | 11/2005 | Padilla |
| 2006/0011720 | A1 | 1/2006 | Call |
| 2006/0200759 | A1 | 9/2006 | Agrawala et al. |
| 2007/0036371 | A1 | 2/2007 | Buil et al. |
| 2007/0118441 | A1 | 5/2007 | Chatwani et al. |
| 2007/0143235 | A1 | 6/2007 | Kummamuru et al. |
| 2008/0109327 | A1 | 5/2008 | Mayle et al. |
| 2008/0126152 | A1 | 5/2008 | Villanueva et al. |
| 2008/0126221 | A1 | 5/2008 | Swanson |
| 2008/0193048 | A1 | 8/2008 | Sun et al. |
| 2008/0228545 | A1 | 9/2008 | Jiang |
| 2008/0243816 | A1 | 10/2008 | Chan et al. |
| 2008/0306966 | A1 | 12/2008 | Culot et al. |
| 2009/0106671 | A1 | 4/2009 | Olson et al. |
| 2009/0132943 | A1 | 5/2009 | Minsky et al. |
| 2009/0254455 | A1 | 10/2009 | Rothey et al. |
| 2010/0008538 | A1 | 1/2010 | Rodriguez et al. |
| 2010/0094849 | A1 | 4/2010 | Rose et al. |
| 2010/0169331 | A1* | 7/2010 | Karidi ............ G06F 17/30864 707/754 |
| 2010/0169340 | A1* | 7/2010 | Kenedy ............ G06Q 30/0631 707/758 |
| 2010/0199227 | A1 | 8/2010 | Xiao et al. |
| 2010/0275152 | A1 | 10/2010 | Atkins et al. |
| 2011/0123115 | A1 | 5/2011 | Lee et al. |
| 2011/0137989 | A1 | 6/2011 | Kiciman et al. |
| 2011/0282839 | A1 | 11/2011 | Paksoy et al. |
| 2012/0078871 | A1 | 3/2012 | Pugh et al. |
| 2012/0232914 | A1 | 9/2012 | Chodavarapu et al. |
| 2013/0124368 | A1 | 5/2013 | Zhang et al. |
| 2013/0268532 | A1* | 10/2013 | Doshi ............ G06F 17/30598 707/737 |

FOREIGN PATENT DOCUMENTS

| | | |
|---|---|---|
| JP | 2002-163559 A | 6/2002 |
| JP | 2003-337909 A | 11/2003 |
| WO | 2015/013954 A1 | 2/2015 |

OTHER PUBLICATIONS

Alrobai, et al., "Investigating the Usability of e-catalogues Systems: Modified Heuristics vs. User Testing", Journal of Technology Research, Dec. 29, 2014, 29 pages.

Bai, "International Preliminary Report on Patentability issued in International Application No. PCT/CN2013/080631", mailed on Feb. 11, 2016, 6 pages.

Choi, "U.S. Office Action issued in copending U.S. Appl. No. 14/032,191, filed Sep. 19, 2013", mailed on Jul. 10, 2015, 13 pages.

Choi, "U.S. Office Action issued in copending U.S. Appl. No. 14/032,191, filed Sep. 19, 2013", mailed on Oct. 22, 2015, 17 pages.

Fan, "International Search Report and Written Opinion issued in International Application No. PCT/CN2013/080631", mailed on May 12, 2014, 10 pages.

Gallup, "U.S. Office Action issued in copending U.S. Appl. No. 13/717,524, filed Dec. 17, 2012", mailed on Apr. 23, 2015, 20 pages.

Gallup, "U.S. Office Action issued in copending U.S. Appl. No. 13/717,524, filed Dec. 17, 2012", mailed on Oct. 20, 2015, 25 pages.

Haq, "U.S. Office Action issued in copending U.S. Appl. No. 13/209,562, filed Aug. 15, 2011", mailed on Mar. 6, 2014, 15 pages.

Haq, "U.S. Office Action issued in copending U.S. Appl. No. 13/209,562, filed Aug. 15, 2011", mailed on Sep. 10, 2014, 7 pages.

Haq, "U.S. Office Action issued in copending U.S. Appl. No. 13/209,562, filed Aug. 15, 2011", mailed on Jan. 5, 2015, 8 pages.

Kingdom Interiors Limited, "Interior Design Mood Board", Kingdom Interiors, Professional service delivering excellent value, 2007, 5 pages.

Nguyen, "U.S. Office Action issued in copending U.S. Appl. No. 13/205,154, filed Aug. 8, 2011", mailed on Apr. 9, 2015, 10 pages.

Nguyen, "U.S. Office Action issued in copending U.S. Appl. No. 13/205,154, filed Aug. 8, 2011", mailed on Jun. 13, 2014, 12 pages.

Nguyen, "U.S. Office Action issued in copending U.S. Appl. No. 13/205,154, filed Aug. 8, 2011", mailed on Dec. 19, 2014, 7 pages.

Olioboard, "Olioboard Frequently Asked Questions", Retrieved from web on Aug. 16, 2011, 13 pages.

Olioboard, "Olioboard Mood Board", 2011, 7 pages.

Passikoff, "The Big Book of Dreams Goes Online", The Keyhole: Peeking at 21st Century Brands, Nov. 19, 2009, 13 pages.

Pohlman, "U.S. Office Action issued in copending U.S. Appl. No. 13/209,566, filed Aug. 15, 2011", mailed on Jan. 31, 2013, 13 pages.

Pohlman, "U.S. Office Action issued in copending U.S. Appl. No. 13/209,566, filed Aug. 15, 2011", mailed on Dec. 4, 2013, 30 pages.

Segev, et al., "Electronic Catalogs: a Technology Overview and Survey Results", ACM 0-89791-812-6/95/11, 1995, 8 pages.

Sunder, "U.S. Office Action issued in copending U.S. Appl. No. 13/209,566, filed Aug. 15, 2011", mailed on Nov. 18, 2015, 30 pages.

Wan, "U.S. Office Action issued in copending U.S. Appl. No. 13/209,566, filed Aug. 15, 2011", mailed on Mar. 30, 2016, 20 pages.

Wan, "U.S. Office Action issued in copending U.S. Appl. No. 13/209,566, filed Aug. 15, 2011", mailed on Aug. 8, 2016, 30 pages.

* cited by examiner

500

510

| camera |

520

HiDef 2000
$1,600
HiDef 2000 2000 20MP digital camera with video

530

Cameraco SuperPic X16
$600
Cameraco SuperPic X16 X16 16MP compact digital camera with video
2 similar products

535

540

HiDef
$200
HiDef 1600 16MP compact digital camera with video

FIG. 5

NEAR-DUPLICATE FILTERING IN SEARCH ENGINE RESULT PAGE OF AN ONLINE SHOPPING SYSTEM

RELATED APPLICATIONS

This patent application claims priority to and is a continuation of U.S. patent application Ser. No. 14/032,191, filed Sep. 19, 2013 and entitled "Near-Duplicate Filtering in Search Engine Result Page of an Online Shopping System" which claims priority to and is a continuation of International Patent Application No. PCT/CN2013/080631, filed Aug. 1, 2013 and entitled "Near-Duplicate Filtering in Search Engine Result Page of an Online Shopping System." The entire contents of the above-identified priority applications are hereby fully incorporated herein by reference.

FIELD OF THE TECHNOLOGY

The disclosed technology relates to filtering near-duplicate results from search engine results pages. Example embodiments relate to filtering near-duplicate products from search results of an online shopping system.

BACKGROUND

A Search Engine Results Page (SERP) is a list, typically of information about web pages, from a search engine in response to a query. Each item in the list may include a title (typically hyperlinked to a web page responsive to the query), a reference to the full version of the listed web page, and a short description from the listed web page corresponding to elements of the query (also known as a "snippet").

In online shopping, a consumer may search for, browse, and purchase goods and services over the Internet, typically by querying an online shopping database through an Internet browser. Each item in an online shopping SERP normally represents a product responsive to query. A consumer may find a product of interest by visiting the website of the retailer directly or by searching among alternative vendors using a shopping search engine.

BRIEF DESCRIPTION OF THE DRAWINGS

FIG. 5 is a search engine results page, in accordance with certain example embodiments.

SUMMARY

Figure 1:
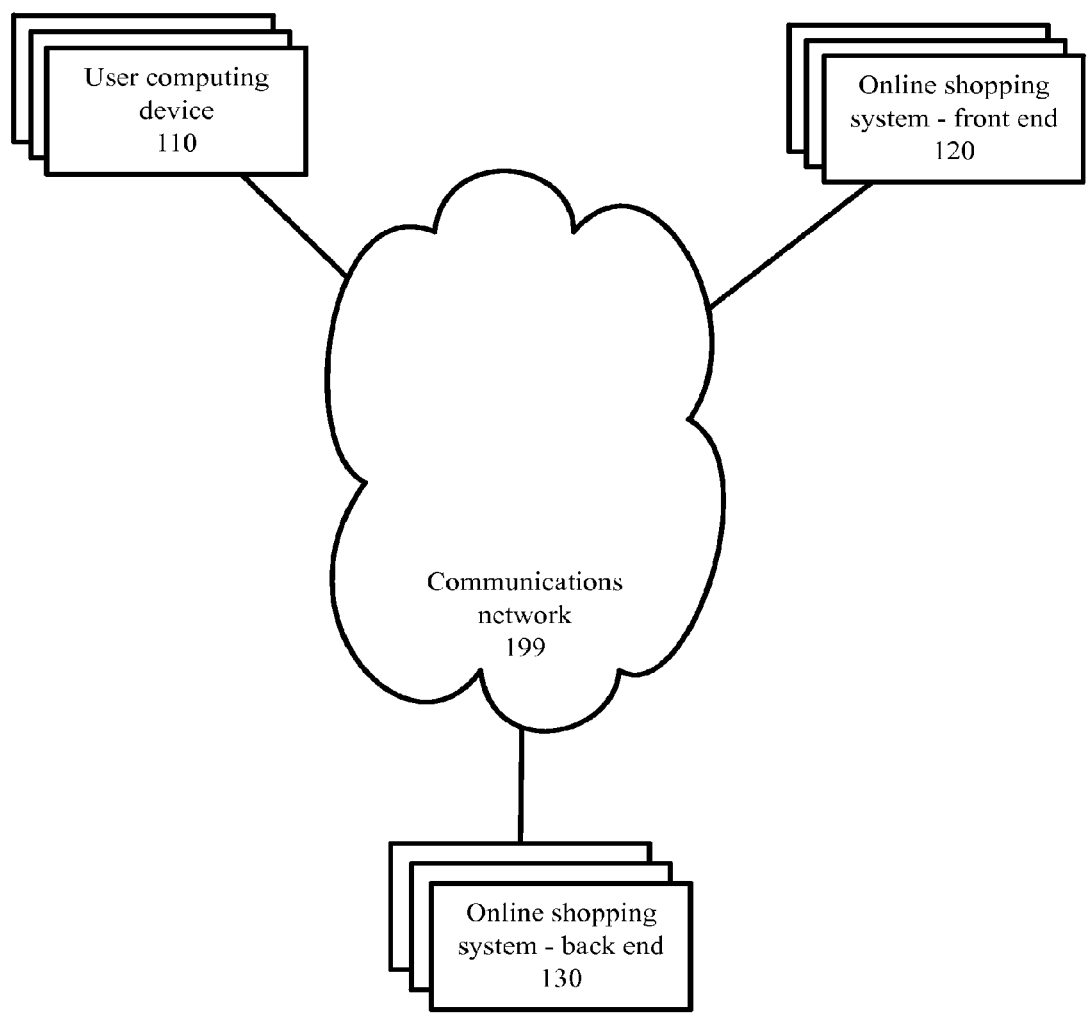
FIG. 1 is a diagram of an architecture for example embodiments of the technology disclosed herein.

The technology includes methods, computer program products, and systems for reducing near-duplicate entries in online shopping system search results. In some embodiments, for each pair of entries in a set of entries, each entry characterizing a product in a data store of an online shopping system and each entry characterized by a set of attributes, embodiments of the technology can determine a distance between the entries in the pair based on the attributes. Entry clusters can be determined from a graph formed with each distance as an edge between nodes representing the entries used to determine the distance. Each such entry cluster can be identified by a cluster identifier. An ordered list of results responsive to the query can be returned from the data store of an online shopping system, and filtered as a function of at least one of the distance and the cluster identifier.

In some embodiments, determining a distance between the entries in the pair based on the attributes comprises determining a weighted sum of the edit distance between attributes of entries of the pair. In some such embodiments, the edit distance is one of: a Hamming distance, a Levenshtein distance, a Damerau-Levenshtein distance, and a Jaro-Winkler distance.

In some embodiments, the set of entries comprises a set of entries of a single vendor of the online shopping system.

In some embodiments, determining entry clusters comprises identifying as clusters, groups of nodes of the graph connected to another node by a distance of less than a predetermined first threshold distance. In some such embodiments, the distance is normalized on an interval from 0 to 1, and the predetermined threshold distance is approximately 0.05.

In some embodiments, the function of at least one of the distance and the cluster identifier is at least one of: excluding more than a predetermined second threshold number of entries from one cluster; after including in the ordered list a first entry having a given cluster identifier, excluding entries within a predetermined third threshold distance of the first entry; excluding entries characterized by a minimum distance to nearest entry less than a predetermined fourth threshold; and including only entries from a given cluster.

In some embodiments the technology can, for at least one result in the ordered list, return a link which, when selected, prompts as a response from the online shopping system an ordered list of products in the same cluster as the at least one result.

These and other aspects, objects, features, and advantages of the example embodiments will become apparent to those having ordinary skill in the art upon consideration of the following detailed description of illustrated example embodiments.

DETAILED DESCRIPTION

Overview

In the data store of product information used in a typical online shopping system, there may be multiple entries with identical or only slightly different product attributes. For example, <model>, <category>, <description>, and <image> may be similar, if not identical, across the entries for two or more products represented in the data store. Such nearly duplicate ("near-duplicate") entries can dominate search results in an online shopping system, reducing the diversity generally desired by consumers. For example, in a shopping search engine comprising a data store of product information from a plurality of vendors, one vendor's near-duplicates can dominate a SERP, especially the first page of a multipage SERP. In some online shopping systems, over 25% of the entries in the product information data store can be near duplicate to at least one other entry.

While subsequent scenarios and examples herein are in the context of a shopping search engine comprising a data store of product information from a plurality of vendors, the principles of the technology are applicable to online shopping systems generally.

It is not apparent that reducing near duplicates across an entire online shopping system will increase the diversity of SERP listings—especially from the point of view of a customer, who may desire to see the same, or near duplicate, products offered on different terms from a variety of companies. Embodiments of the present technology can reduce intra-company near duplicate entries in an online shopping system SERP, thereby increasing the diversity of vendors represented in an online shopping system SERP.

Turning now to the drawings, in which like numerals represent like (but not necessarily identical) elements throughout the figures, example embodiments of the present technology are described in detail.

Example System Architecture

FIG. 1 is a diagram of an architecture 100 for example embodiments of the technology disclosed herein. As depicted in FIG. 1, the architecture 100 includes network devices 110, 120, and 130; each of which may be configured to communicate with one another via communications network 199. In some embodiments, a user associated with a device must install an application and/or make a feature selection to obtain the benefits of the techniques described herein.

Network 199 includes one or more wired or wireless telecommunications means by which network devices may exchange data. For example, the network 199 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH wireless technology connection, a near field communication (NFC) connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network device can include a communication module capable of transmitting and receiving data over the network 199. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device. In the example embodiment depicted in FIG. 1, the network device 110 may be operated by a user, and network devices 120 and 130 may be operated by an online shopping system operator.

The network connections illustrated are example and other means of establishing a communications link between the computers and devices can be used. Moreover, those having ordinary skill in the art having the benefit of the present disclosure will appreciate that the network devices illustrated in FIG. 1 may have any of several other suitable computer system configurations. For example, a user computer device 110 may be embodied as a mobile phone or handheld computer may not include all the components described above.

In the architecture 100 of FIG. 1, entries in a data store of an online shopping system back end 130 may include entries representing products or services (hereinafter both referred to as "products"). Some of the entries may be near-duplicates of each other. Each entry can be characterized by attributes such as <model> and <description>. A distance between entries, such as an edit distance, can be determined in the online shopping system back end 130. Such edit distance can be used to identify clusters of near duplicate entries. The distances, for example the minimum distance between any given entry and its closest neighbor, and a cluster identifier can be used (individually or in combination) by the online shopping system front end 120 to reduce the number of near-duplicate entries present in search results that are presented via the user computing device 110 (typically in response to a query from the user computing device 110).

Example Processes

The example methods illustrated in the following figures are described hereinafter with respect to the components of the example operating environment 100. The example methods may also be performed with other systems and in other environments.

Figure 2:
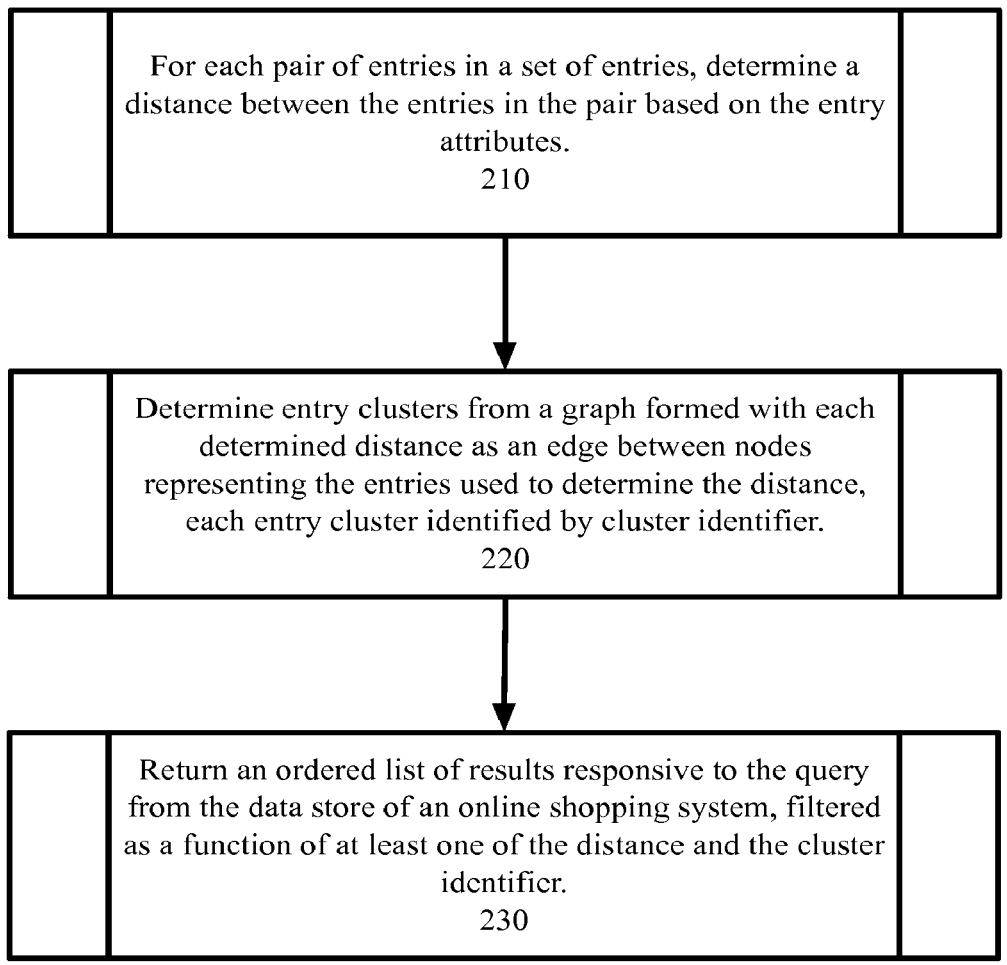
FIG. 2 is a diagram depicting method for reducing near-duplicate entries in online shopping system search results, in accordance with certain example embodiments.

Referring to FIG. 2, example processes 200 for filtering near-duplicates from online shopping system search results are illustrated. In such processes, products offered for sale in an online shopping system can be represented by entries in a data store of the online shopping system. Each entry can be characterized by a set of entry attributes. For example, a camera can be represented by a first entry that includes <name> with the string "Cameraco SuperPic,"<model> with the string "X40," and <description> with the string "16MP compact digital camera." Additional example entries are identified in TABLE 1. For each pair of entries in a set of entries in the online shopping system data store, embodiments of the present technology can determine a distance between the entries in the pair based on the entry attributes—Block 210.

TABLE 1

| Index # | Name | Model | Description | Importance Score |
|---|---|---|---|---|
| 1 | Cameraco SuperPic | X16 | 16 MP compact digital camera | 87 |
| 2 | Cameraco SuperPic X16 | X16 | 16 MP compact digital camera with video | 123 |
| 3 | HiDef | 1600 | 16 MP compact digital camera with video | 112 |
| 4 | Cameraco | SuperPic X16 | 16 MP compact digital camera with video | 96 |

TABLE 1-continued

| Index # | Name | Model | Description | Importance Score |
|---|---|---|---|---|
| 5 | HiDef 2000 | 2000 | 20 MP digital camera with video | 140 |

For example, counting words unique to one of entry #1 or entry #2 results in a distance of two (2) words, i.e., "with" and "video." Counting words unique to one of entry #1 and entry #3 results in a distance of seven (7) words, i.e., "Cameraco," "SuperPic," "X16," "HiDef," "1600," "with," and "video." TABLE 2 lists the pairwise distances between pairs by index number determined in the same fashion.

TABLE 2

| Pair by Index # | Distance (words) |
|---|---|
| (1, 2) | 2 |
| (1, 3) | 7 |
| (1, 4) | 2 |
| (1, 5) | 11 |
| (2, 3) | 5 |
| (2, 4) | 0 |
| (2, 5) | 8 |
| (3, 4) | 5 |
| (3, 5) | 4 |
| (4, 5) | 7 |

In general, a string metric can be used to determine distance. A string metric is a metric that measures similarity between two strings for approximate string matching or comparison and in fuzzy string searching.

Figure 3:
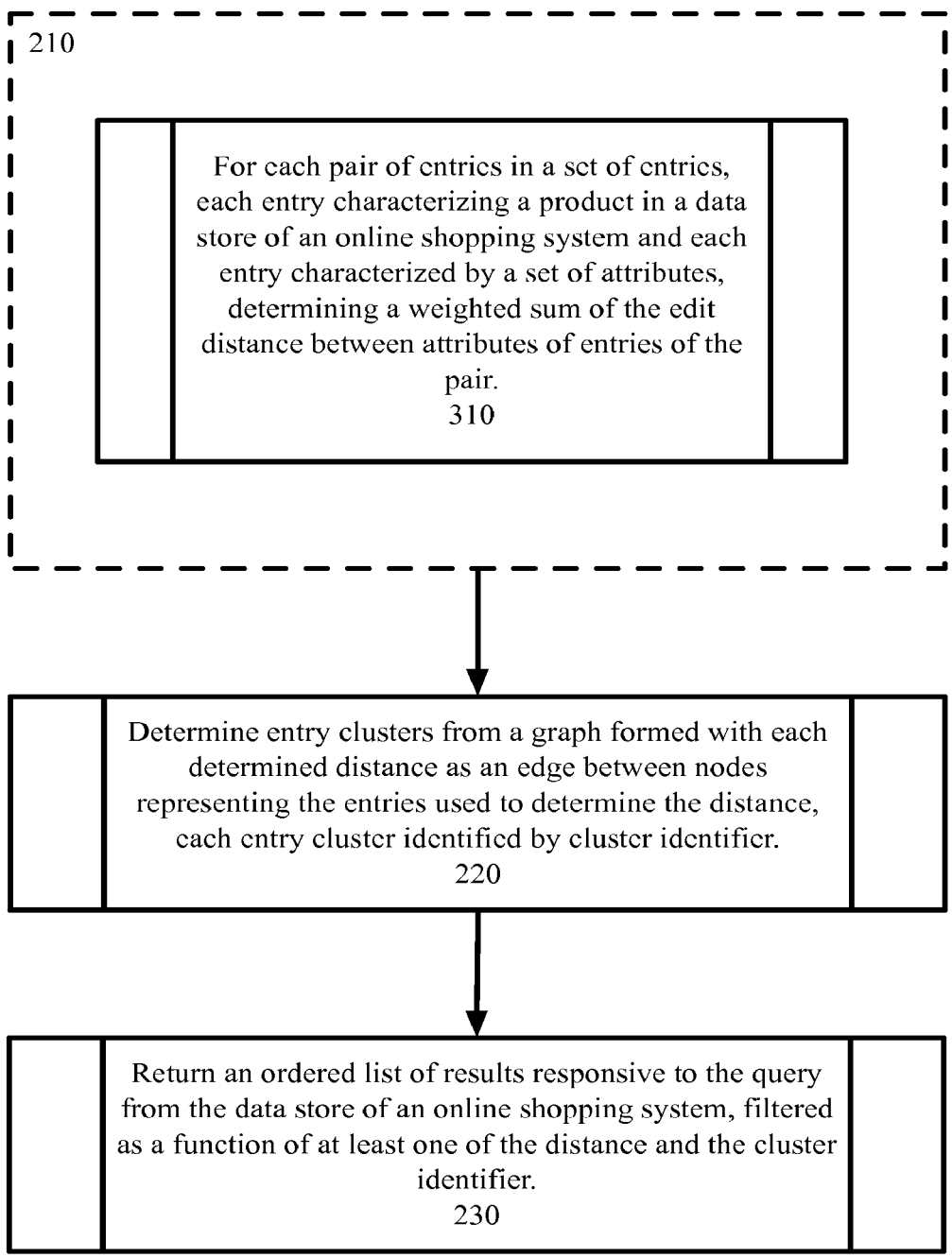
FIG. 3 is a diagram depicting method for reducing near-duplicate entries in online shopping system search results, in accordance with certain example embodiments.

Referring to FIG. 3, and continuing to refer to prior figures for context, processes 300 for filtering near duplicates from online shopping system search results are illustrated are illustrated. Block 220 and Block 230 are described elsewhere herein. In such processes 300, determining a distance between entries in a pair of entries can include determining a weighted sum of attributes of an edit distance (a type of spring metric) between attributes of the entries—Block 310. For example, and one of a Hamming distance, a Levenshtein distance, a Damerau-Levenshtein distance, and a Jaro-Winkler distance can be used.

Returning to FIG. 2, embodiments of the technology can determine entry clusters from a graph formed with each determined distance as an edge between nodes representing the entries used to determine the distance—Block 220. Each entry cluster can be identified by cluster identifier.

Figure 4:
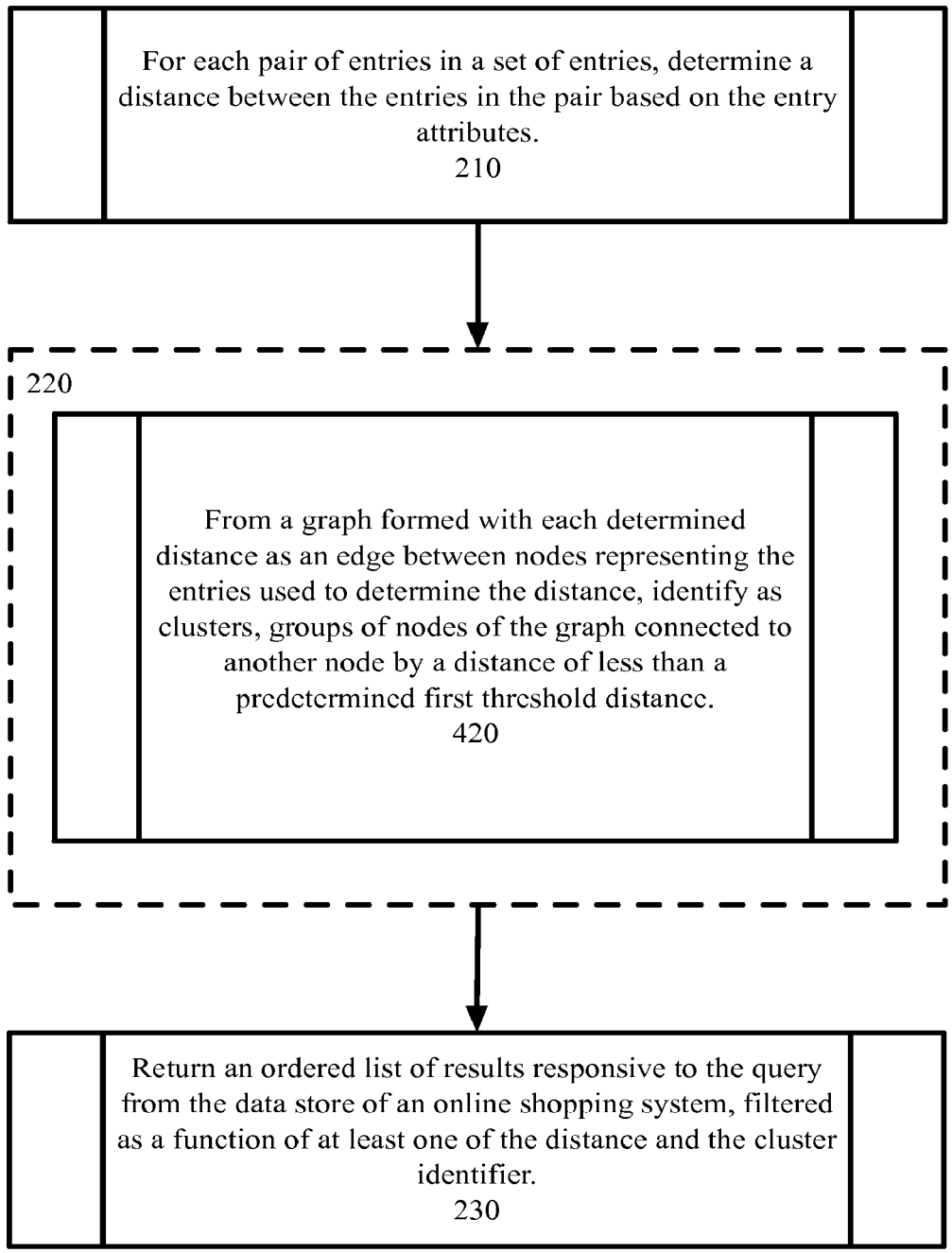
FIG. 4 is a diagram depicting method for reducing near-duplicate entries in online shopping system search results, in accordance with certain example embodiments.

Referring to FIG. 4, and continuing to refer to prior figures for context, processes 400 for filtering near duplicates from online shopping system search results are illustrated. Block 210 and Block 230 are described elsewhere herein. In such processes 400, each determined distance can be interpreted as an edge between nodes representing the entries used to determine the distance. In some embodiments, the technology can identify those groups of nodes connected to another node by a distance of less than a predetermined first threshold distance as a cluster—Block 420.

Continuing with the example from TABLE 1 and TABLE 2, with a predetermined threshold of three (3) words, entries #1, #2, #4 can be identified as in a single cluster. Entry #3 has distances of 7, 5, 5, and 4 words to entries #1, #2, #4, and #5 respectively; and as such is in its own cluster. Entry #5 has distances of 11, 8, 4, and 7 words to the other entries; and as such also is in its own cluster. Each cluster can take a cluster identifier from one of the entries in the cluster. For example, where the product information data store uses an importance score as an attribute of an entry, some attribute of the entry with the highest importance score can be used as the cluster identifier. For the present example, the Index # of the entry with the highest importance score is used, i.e., the #1, #2, #4 cluster is cluster #2. Entry #3 is cluster #3, and entry #5 is cluster #5. TABLE 3 illustrates assignment of cluster identifier in accordance with the present example. The entries for each product in the data store of the online shopping system can be edited to include the assigned cluster identifier.

TABLE 3

| Index # | Name | Model | Description | Importance Score | Cluster ID |
|---|---|---|---|---|---|
| 1 | Cameraco SuperPic | X16 | 16 MP compact digital camera | 87 | 2 |
| 2 | Cameraco SuperPic X16 | X16 | 16 MP compact digital camera with video | 123 | 2 |
| 3 | HiDef | 1600 | 16 MP compact digital camera with video | 112 | 3 |
| 4 | Cameraco | SuperPic X16 | 16 MP compact digital camera with video | 96 | 2 |
| 5 | HiDef 2000 | 2000 | 20 MP digital camera with video | 140 | 5 |

When presented with a query, for example a query from a user computing device 110 to an online shopping system front end 120, the online shopping system can return entries from its data store (typically maintained by the online shopping system back end 130) that are responsive to the query. Typically, these results are in an ordered list by some measure of responsiveness of the entry to the query—with the most responsive entries first in the list. As noted above, near duplicate entries may dominate the most responsive results—an undesirable circumstance.

Returning to FIG. 2, embodiments of the present technology can return, from an online shopping system data store in response to such a query, an ordered list of results that has been filtered by at least one of distance and cluster identifier—Block 230. Continuing with the present example, the online shopping system is configured to return only one result per cluster. Referring to FIG. 5, a search engine results page 500 can be returned in response to the query "camera" 510 received at the online shopping system front end 120 from a user computing device 110, the online shopping system returns a search result page 500 with entries #5 (reference numeral 520), #2 (reference numeral 530), and #3 (reference numeral 540) from TABLE 3 (in that order); and does not return entries #1 and #4 from TABLE 3 (which can be accessed as "similar products" through link 535).

Figure 6:
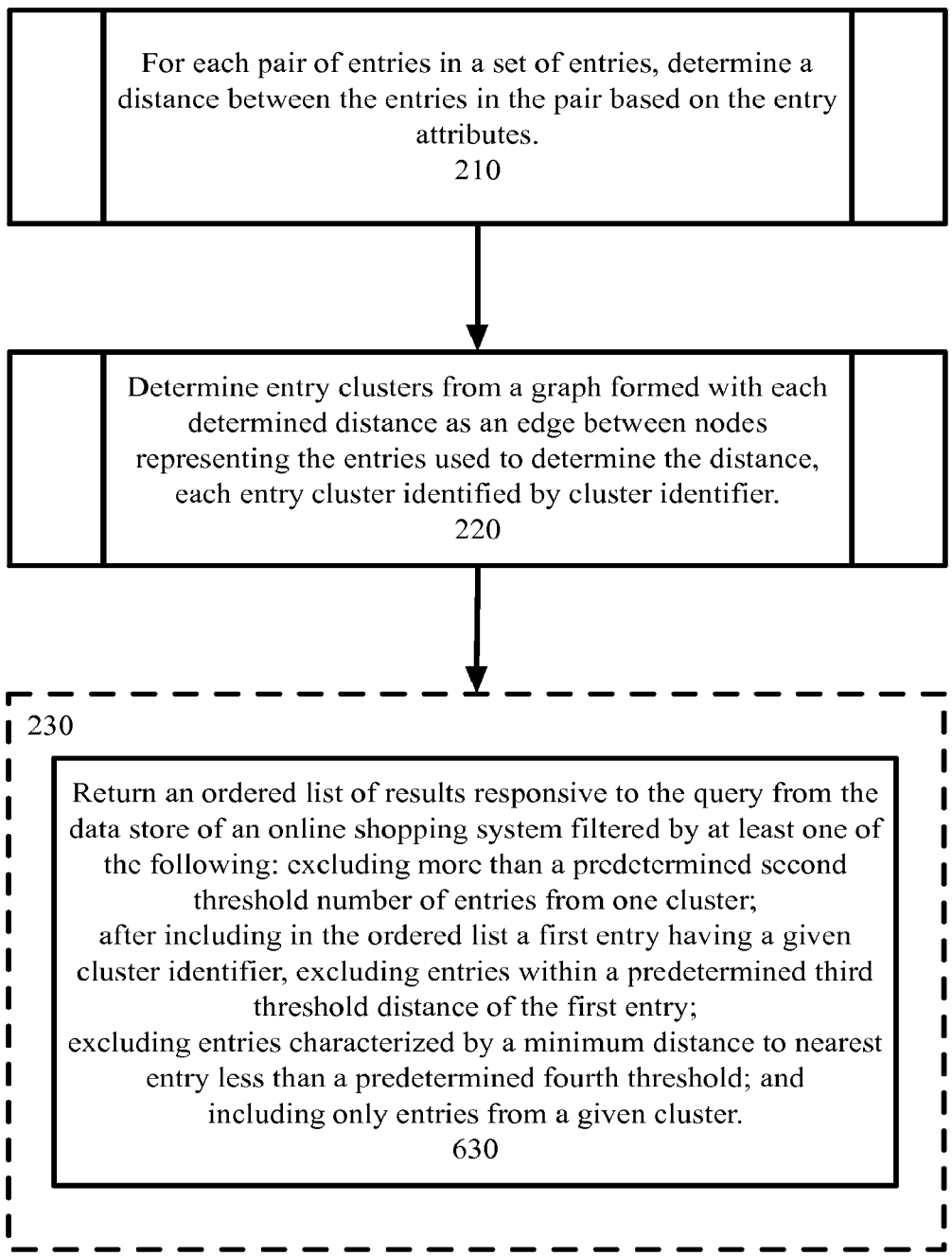
FIG. 6 is a diagram depicting method for reducing near-duplicate entries in online shopping system search results, in accordance with certain example embodiments.

Referring to FIG. 6, and continuing to refer to prior figures for context, processes 600 for filtering near duplicates from online shopping system search results are illustrated are illustrated. Block 210 and Block 220 are described elsewhere herein. In such processes 600, the ordered list of results that has been filtered by at least one of distance and cluster identifier from an online shopping system in response to a query can be filtered various ways including one of the following: excluding more than a predetermined second threshold number of entries from any one cluster; after including in the ordered list a first entry having a given cluster identifier, excluding entries within a predetermined third threshold distance of the first entry; excluding entries characterized by a minimum distance to nearest entry less than a predetermined fourth threshold; and including only entries from a given cluster—Block 630.

Figure 7:
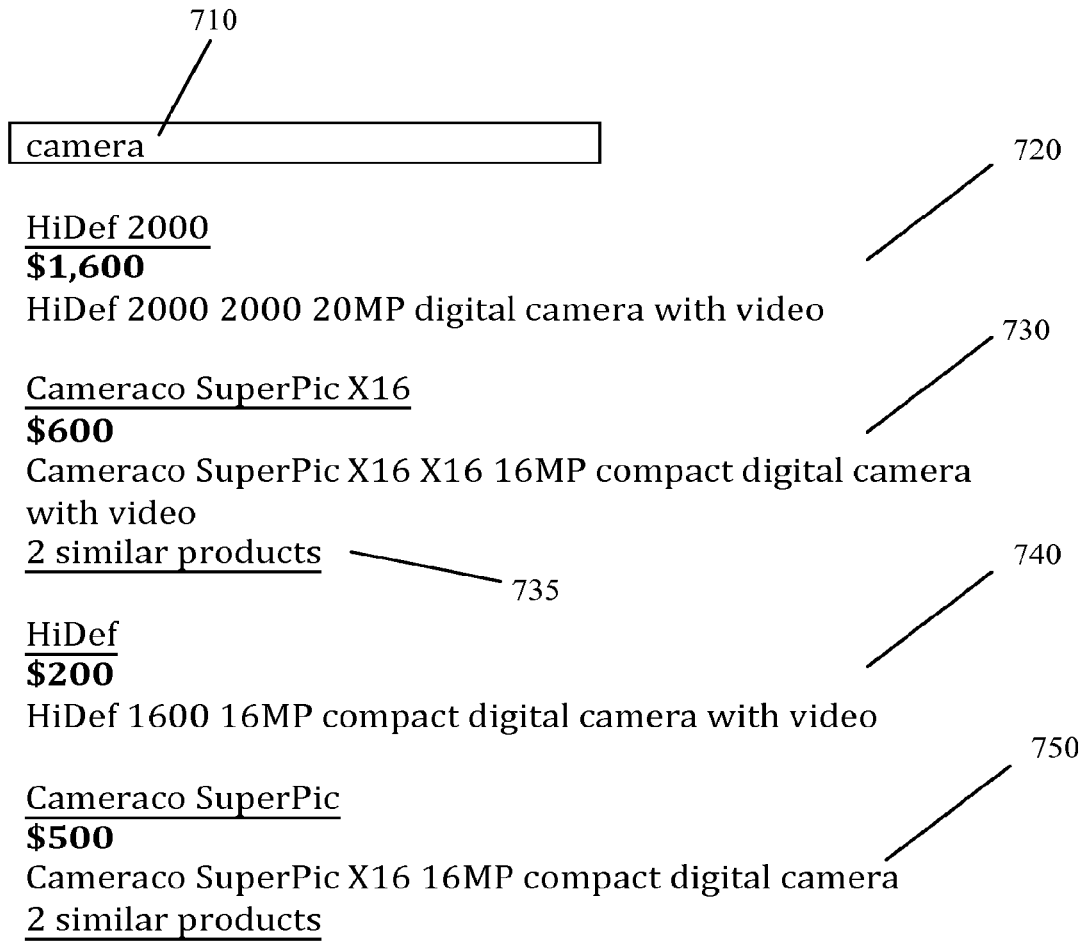
FIG. 7 is a search engine results page, in accordance with certain example embodiments.
Figure 8:
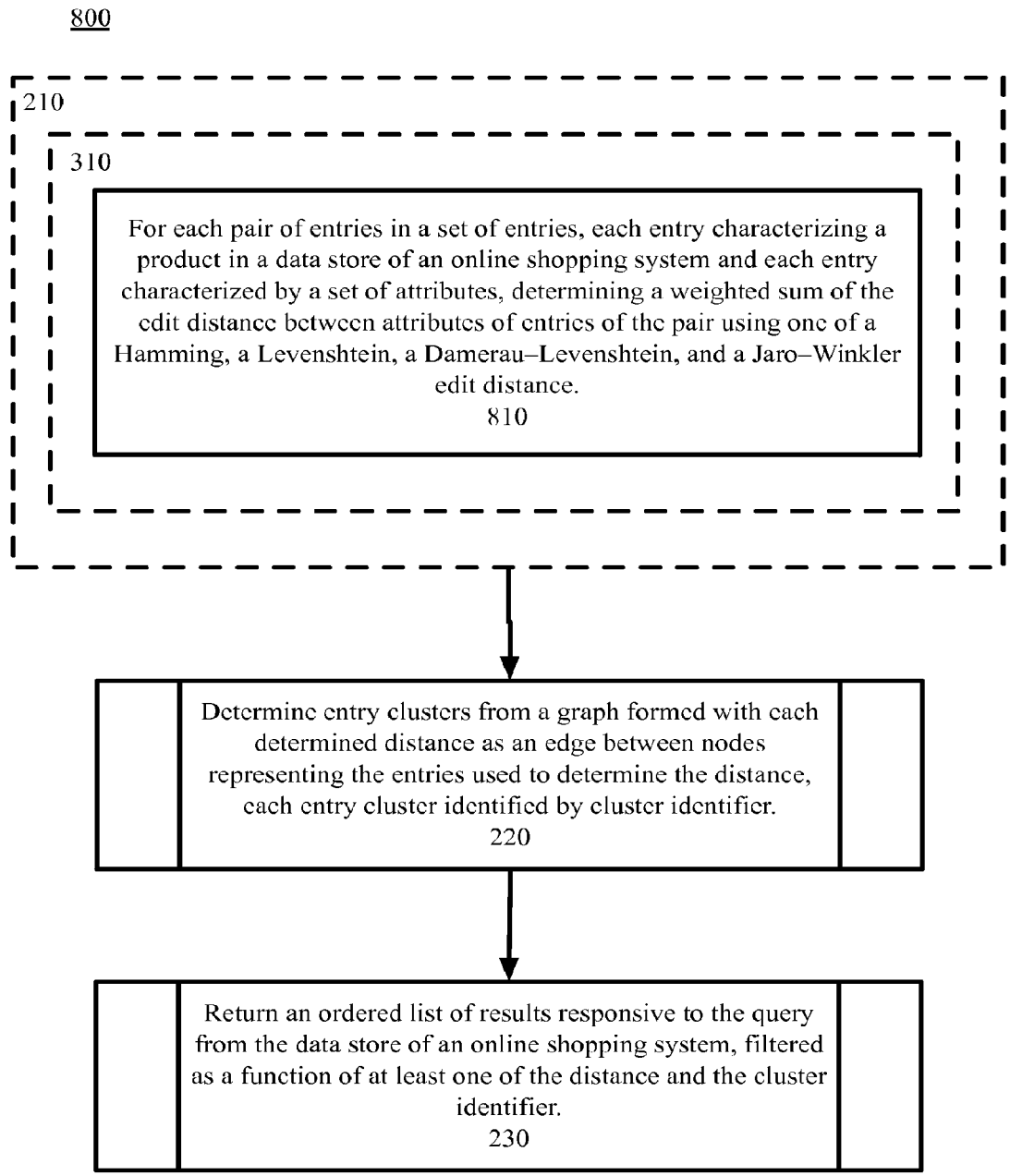
FIG. 8 is a diagram depicting method for reducing near-duplicate entries in online shopping system search results, in accordance with certain example embodiments.

In the example described in connection with FIG. 5, the predetermined second threshold number of distance is one (1). As a further example, consider the query "camera" as above, a predetermined third threshold distance of one (1) word, and a search engine results page with entries ordered by importance score. Referring to FIG. 7, under such conditions, a search engine results page 700 can be returned in response to the query "camera" 710 received at the online shopping system front end 120 from a user computing device 110, the online shopping system returns a search result page 700 with entries #5 (reference numeral 720), #2 (reference numeral 730), and #3 (reference numeral 740), and #1 (reference numeral 750) from TABLE 3 (in that order); and does not return entry #4 from TABLE 3, even though entry #4 has a higher importance score (96) than the importance score of entry #1 (87) from TABLE 3. Entry #4 has been filtered out as being a distance (0 words) less than the third threshold distance (1 word). As in the example of FIG. 5, "similar products" through links 535 (accesses entries #1 and #4).

Other Example Embodiments

Consider as further description of embodiments of the technology, embodiments that can reduce the number of near-duplicate results from the same company in an online shopping system using a parallel processing indexing pipeline. Each entry in a data store of such a system can include the following attributes: name (product title that appear in the search result page), model (model of the product), description (description of product, will be used to generate snippet for product result), and thumbnail key (a finger print key for the product thumbnail). The parallel processing architecture can present a Map Reduce framework.

In a Map Reduce framework, a Map( ) procedure can perform filtering and sorting (for example sorting products by country of manufacturing into queues, one queue for each country) and a Reduce( ) procedure that can perform a summary operation (such as counting the number of products manufactured in each country). Such a framework can allocate distributed computing devices, running the various tasks in parallel, managing communications and data transfers between the various computing devices, providing for redundancy and failures, and management of the computing process.

In a mapper, the technology can iterate the data store, and for each valid product, output the above attributes and the q-score of the product. The q-score can be a static, query-independent importance score of a product. The output key can be the company identifier of the product. After shuffling, the products with the same company identifier can be gathered in the same reducer. In the reducer, the products can be sorted by q-score in descending order and output with the product attributes.

In some embodiment, the pipeline can be operated daily, and the incremental data store change usually may be marginal from day to day. To cull unnecessary computations, such embodiments can update the entries for only those companies whose entries have changed from previous day in the pipeline. To do this, such embodiments can store a fingerprint of the company products for each company in an update. In the next day, such embodiments can check if the company's fingerprint has changed. Only entries for companies whose fingerprint has changed need by processed.

For each group of company products, the technology can compute all pairs of product distance, filter the product pairs/edges with distance exceeding a given threshold, and perform clustering based on the remaining near duplicate product edges. This can involve the following components: near duplicate distance metric, and a clustering algorithm.

For each product pair (P, Q), the neardup score (or distance) of D(P, Q) can be calculated as the weighted sum of the edit distances of P and Q's attributes: D(P, Q)=K_name*ED(P_name, Q_name)+K_model*ED (P_model, Q_model)+K_description*ED(P_description, Q_description)+K_thumb*ED(P_thumb, Q_thumb), where K_* is a constant factor for each attribute, and P_* and Q_* are attributes of P and Q. For example, P_thumb is the thumbnail key of product P, and K_thumb is the constant for thumbnail key, etc. The function ED can be the normalized Levenshtein distance of two input string A, B: ED=Levenshtein_Distance(A, B)/max(length(A), length (B)).

The value of ED can be within the range of [0, 1]. The constants also can be within the range of [0,1], and sum up to 1.0, so that the value of distance function D(P, Q) is also within the [0, 1] range.

Groups of entries for company products can be input in a Map-Reduce and clusters of near-duplicate products can be determined, where the products in each cluster are considered near-duplicate to each other. For each group of products from the same company, a pair-wise near-duplicate score can be computed. This forms a complete graph of product edges where each edge can be assigned a near-duplicate score. Given a near-duplicate score threshold T, edges whose score exceeds T can be filtered out. For example, for T=0.05, means that pairs of products that are 5% different from each other (or 95% similar to each other) are considered.

The filtered graph is much more sparse and computationally lightweight than the unfiltered graph. To find the clustering from the near-duplicate graph for each company, a graph traversal can be performed on the filtered graph to find all connected components as the final near-duplicate clusters.

From the clustering result, three (3) near-duplicate fields for each product can be added to each entry: ProductNeardupinfo {cluster_id, min_score, num_products}. Cluster_id can be a unique identifier for a near-duplicate cluster. Each product in the cluster can be assigned the same identifier. In some embodiments the identifier can be set to an attribute of the first product (one with the highest q-score) in the cluster as cluster_id.

This identifier can be useful in two ways. First, in a buyer frontend, an online shopping system can show products in the same cluster by restricting search result with the given cluster_id. Second, typical search infrastructures support crowding by a given field. With cluster_id indexed, the online shopping system can crowd the search result by cluster_id and limit a maximum number of products per cluster. This can have the effect of showing only the most relevant products per near-duplicate cluster in the search result, increasing search diversity.

Min_score can be the closest distance an entry it is to some other entry in the same cluster. This score can be useful in determining how changing the near-duplicate threshold T may affect the near-duplicate filtering in the search result. At a buyer frontend, a search restrict can be set for the threshold T to filter out product results having a min_score at or lower than T. For example, setting T=0 means omitting entries that are identical to some other entry. Setting T=0.01 means omitting products that are no more than 1% different from some other products in the same company.

Num_products can indicate the number of products in the same cluster. This can be used in buyer frontend user interface to show how many products fall into the same cluster.

The data store can be indexed by cluster_id and min_score for each product. In buyer frontend, two search restricts on these fields can be used. First, NDCL can be a search restrict on the cluster_id field of each product. This is a parameter in the search uniform resource locator (URL) to limit the result to only include products in the same cluster. Second, NDTH can be a search restrict on the min_score field of each product. This can be a parameter in the search URL to limit the result to only include products with higher min_score. For example, NDTH=0.05 can be added to the search URL to filter out near-duplicate products (no more than 5% different from other products).

In the user interface, a link can be shown beside each search result "See all <num_products> similar products". The link can direct to a new search result page showing all the products in the same near-duplicate cluster. For example, if a result product belongs to the cluster with cluster_id="123", the link can contain the parameter "NDCL=123".

In some embodiments of the technology, product near duplicate information computation can be parallelized in a different fashion than described elsewhere herein, by introducing an additional Map-Reduce to unroll the loop to compute near-duplicate scores for all product pairs and dumping an intermediate product edge store. The output of this Map-Reduce is the set of all product edges, e.g. (P_id, Q_id, C_id) for every products P and Q in company C. The product edges can then be evenly distributed so as to achieve better load-balance in the subsequent Map-Reduce to processes these product edges.

In the Map-Reduce used to processes all the product edges, the product edges (P_id, Q_id, C_id) can be processes and a ProductNeardupinfo can be output for Q, which is keyed by C_id. Two optimizations can be applied in the mapper.

First, since near-duplicate edges with min_score <=T are of concern, and the bottleneck of near duplicate score function D(P, Q) is the edit distance of product description, for each edge (P, Q), the technology can determine: D'(P, Q)=K_name*ED(P_name, Q_name)+K_model*ED(P_model, Q_model)+K_thumb*ED(P_thumb, Q_thumb). If D'(P, Q) is greater than threshold T, the technology does not have to compute ED(P_description, Q_description). Second, by the same reasoning, the edges with min_score>T in the mapper output can be discarded.

In the reducer, all products can be grouped by company and clustering can be performed on the company products. This parallelization can make the time complexity of computing product edges not depend on the biggest company, but can be shared evenly among MR mappers.

For some companies in the data store of the online shopping system, there can be over 30,000 entries. In theory, there could be ~1B near duplicate edges for such a company, in which case it may be prohibitive to store the graph in memory in full. In some embodiments a streaming version of union-find algorithm can be used to build the disjoint clusters. In lieu of building a near-duplicate graph, the clusters can be built on the fly while the edges are read in the reducer. The algorithm is as follows:

BUILD-CLUSTERS:
for edge (P, Q) in stream:
    UNION(P_cluster, Q_cluster)
for P in company:
    P_cluster=FIND(P_cluster)
FIND(P):
    if P_cluster !=P_id:
    P_cluster=FIND(P_cluster)
    return P_cluster
UNION(P, Q):
    PP=FIND(P_cluster)
    QP=FIND(Q_cluster)
    PP_cluster=QP_cluster The memory cost in BUILD-CLUSTERS doesn't depends on the entire graph, for example $O(N^2)$, but on the number of products $O(N)$.

Further, since some embodiments of the technology described herein filter out near-duplicate products entries and only keep one product within each cluster in the search result, search quality/coverage could be lost if the near-duplicate entries contain more index information. In particular, product category can be indexed. For example, if near-duplicate entries for products A, B, C with similar title, model, description, thumbnail but with entirely different product categories are in the data store, and only product A is marked in the data store to be not near-duplicate, for some queries that would trigger B or C but not A, or trigger them with higher rank than A could lose search coverage/quality. To address this, in some embodiments the technology can merge the category for all near-duplicate products in a cluster. For the above example, the categories of all A, B and C, can be unioned, and then reset as the category union. This way for each near-duplicate cluster, all product categories will be indexed for all the products.

Figure 9:
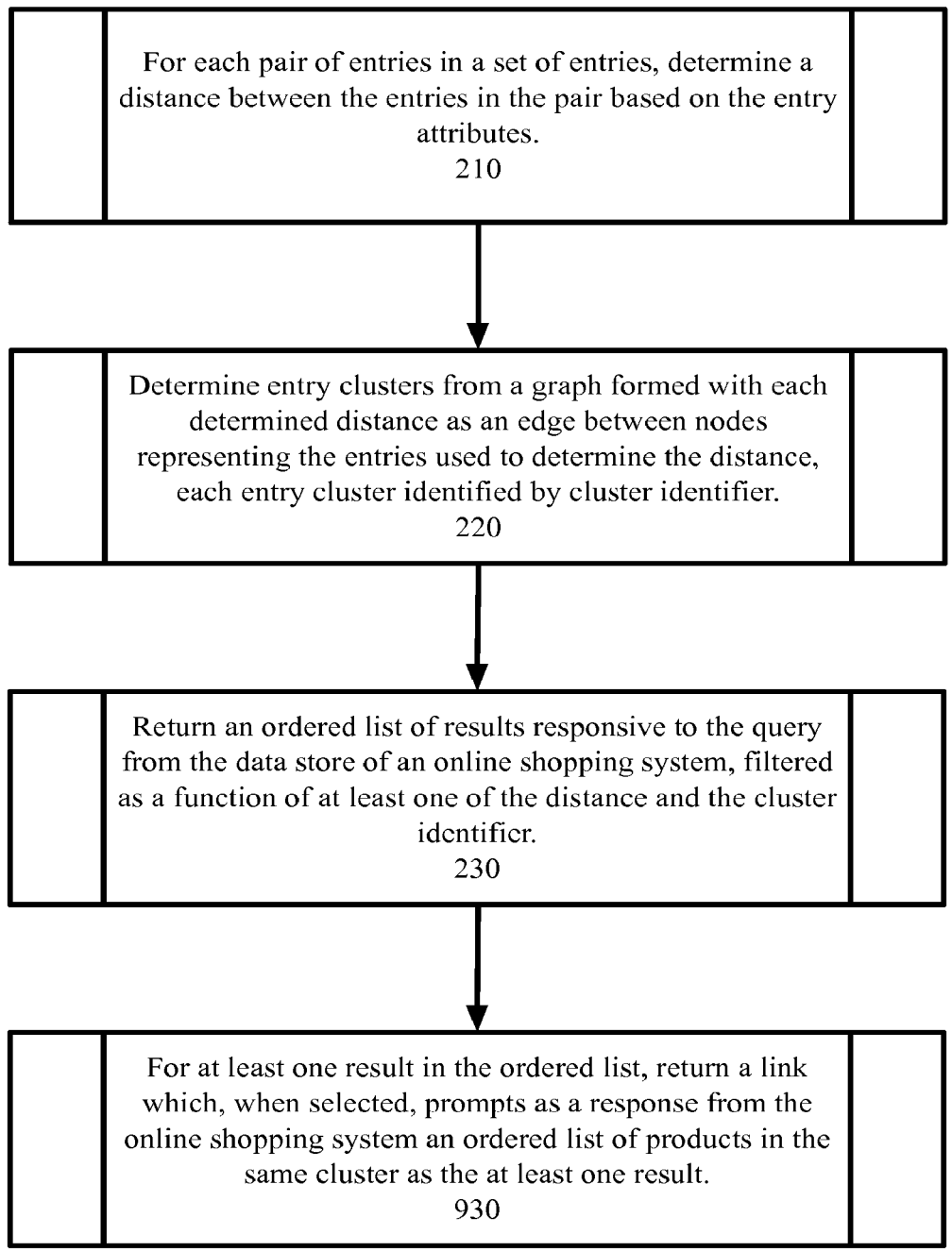
FIG. 9 is a diagram depicting method for reducing near-duplicate entries in online shopping system search results, in accordance with certain example embodiments.
Figure 10:
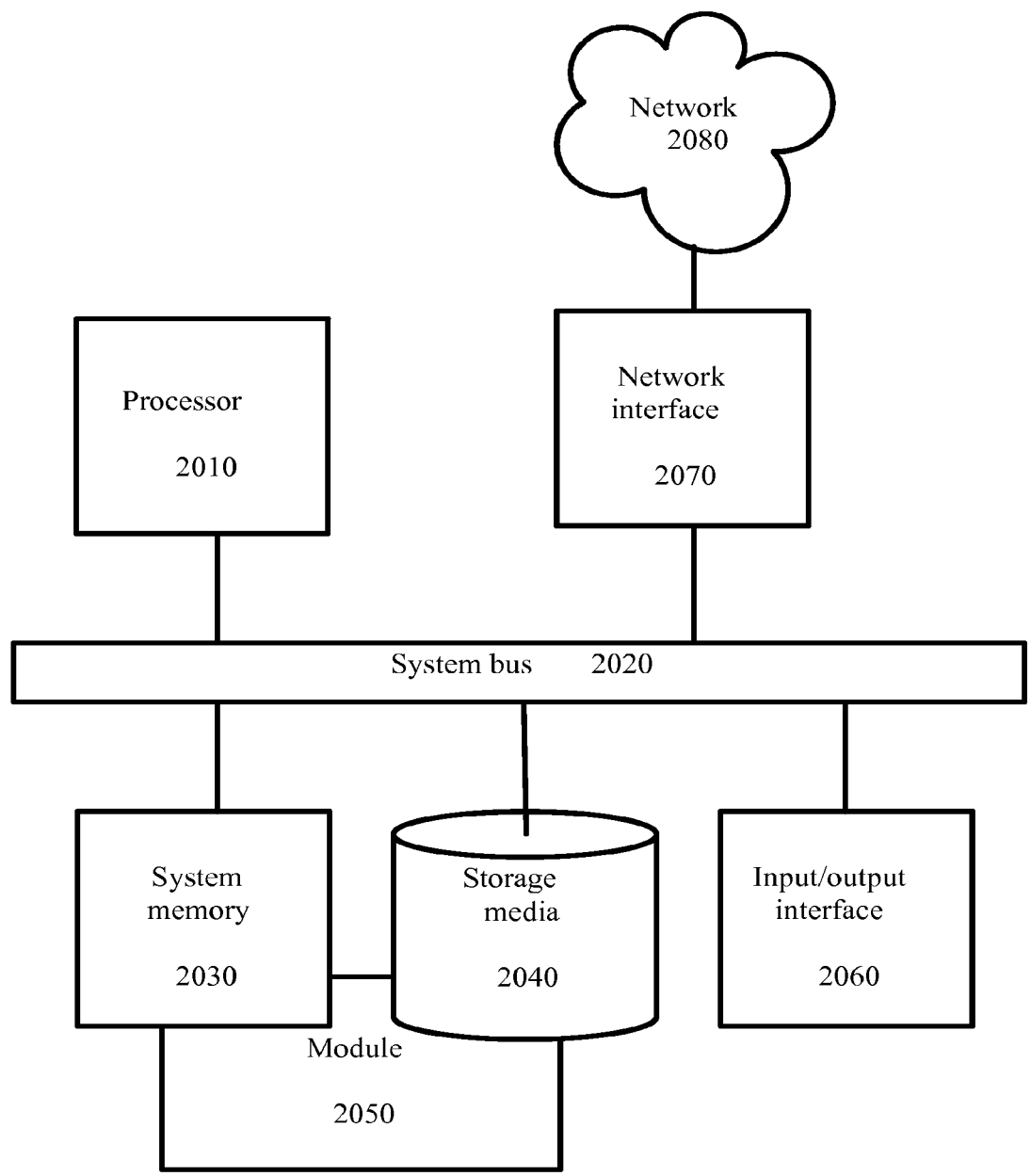
FIG. 10 is a block diagram depicting a computing machine and a module, in accordance with certain example embodiments.

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid sate drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device, for example, a system on chip (SOC), system on package (SOP), or ASIC device.

In situations in which the technology discussed here collects personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (, for example, to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A computer-implemented method to reduce same merchant near-duplicate entries in online shopping system search results, comprising:

for each pair of entries in a set of entries from the same merchant, each entry characterizing a product in a data store of an online shopping system and each entry characterized by a set of quantified attributes, determining, by one or more computing devices, a distance between the entries in the pair in a vector space of the quantified attributes;

determining, by the one or more computing devices, clusters of entries as a function of the determined distance between each pair of entries;

receiving, by the one or more computing devices, a query directed to the data store; and returning, by the one or more computing devices, an ordered list of results responsive to the query from the data store of an online shopping system, filtered by at least one of the following:

excluding from the ordered list all but a predetermined first threshold number of entries from each cluster of entries; and after including in the ordered list a first entry, excluding entries within a predetermined threshold distance of the first entry.

2. The method of claim 1, wherein determining a distance between the entries in the pair based on the quantified attributes comprises determining a weighted sum of an edit distance between the quantified attributes of entries of the pair.

3. The method of claim 2, wherein the edit distance is one of: a Hamming distance, a Levenshtein distance, a Damerau-Levenshtein distance, and a Jaro-Winkler distance.

4. The method of claim 1, wherein determining clusters of entries comprises identifying as clusters groups of entries related to another entry by a determined distance of less than a predetermined first threshold distance.

5. The method of claim 4, wherein the distance is normalized on an interval from 0 to 1, and the predetermined threshold distance is approximately 0.05.

6. The method of claim 1, wherein filtering by at least one of the following comprises:

excluding entries characterized by a minimum distance to nearest entry less than a predetermined third threshold; and including only entries from a given cluster of entries.

7. The method of claim 1, further comprising:

for at least one result in the ordered list, returning, by the one or more computing devices, a link: which, when selected, prompts as a response from the online shopping system an ordered list of products in the same cluster as the at least one result.

8. A computer program product, comprising:
a non-transitory computer-readable storage device having computer-executable program instructions embodied thereon that when executed by a computer cause the computer to reduce same merchant near-duplicate entries in online shopping system search results, the computer-executable program instructions comprising:
computer-executable program instructions to determine, for each pair of entries from the same merchant in a set of entries, each entry characterizing a product in a data store of an online shopping system and each entry characterized by a set of quantified attributes, a distance between the entries in the pair in a vector space of the quantified attributes;
computer-executable program instructions to determine clusters of entries from a graph formed with each determined distance as an edge between nodes representing the entries used to determine the corresponding distance, each entry cluster identified by a cluster identifier;
computer-executable program instructions to receive a query directed to the data store; and
computer-executable program instructions to return an ordered list of results responsive to the query from the data store of an online shopping system, filtered by at least one of the following:
excluding from the ordered list all but a predetermined first threshold number of entries from each cluster of entries; and
after including in the ordered list a first entry, excluding entries within a predetermined threshold distance of the first entry.

9. The computer program product of claim 8, wherein determining a distance between the entries in the pair based on the quantified attributes comprises determining a weighted sum of an edit distance between the quantified attributes of entries of the pair.

10. The computer program product of claim 9, wherein the edit distance is one of: a Hamming distance, a Levenshtein distance, a Damerau-Levenshtein distance, and a Jaro-Winkler distance.

11. The computer program product of claim 8, wherein determining clusters of entries comprises identifying as clusters groups of entries related to another entry by a determined distance of less than a predetermined first threshold distance.

12. The computer program product of claim 11, wherein the distance is normalized on an interval from 0 to 1, and the predetermined threshold distance is approximately 0.05.

13. The computer program product of claim 8, wherein filtering by at least one of the following comprises:
excluding entries characterized by a minimum distance to nearest entry less than a predetermined third threshold; and
including only entries from a given cluster.

14. The computer program product of claim 8, further comprising:
for at least one result in the ordered list, returning, by one or more computing devices, a link: which, when selected, prompts as a response from the online shopping system an ordered list of products in the same cluster as the at least one result.

15. A system to reduce same merchant near-duplicate entries in online shopping system search results, comprising:
a storage device; and
a processor communicatively coupled to the storage device, wherein the processor executes application code instructions that are stored in the storage device to cause the system to:
determine, for each pair of entries in a set of entries from the same merchant, each entry characterizing a product in a data store of an online shopping system and each entry characterized by a set of quantified attributes, a distance between the entries in the pair in a vector space of the quantified attributes;
determine clusters of entries from a graph formed with each determined distance as an edge between nodes representing the entries used to determine the corresponding distance, each entry cluster identified by a cluster identifier;
receive a query directed to the data store; and
return an ordered list of results responsive to the query from the data store of an online shopping system, filtered by at least one of the following:
excluding from the ordered list all but a predetermined first threshold number of entries from each cluster of entries; and
after including in the ordered list a first entry, excluding entries within a predetermined threshold distance of the first entry.

16. The computer program product of claim 15, wherein determining a distance between the entries in the pair based on the quantified attributes comprises determining a weighted sum of an edit distance between the quantified attributes of entries of the pair.

17. The system of claim 16, wherein the edit distance is one of: a Hamming distance, a Levenshtein distance, a Damerau-Levenshtein distance, and a Jaro-Winkler distance.

18. The system of claim 15, wherein determining clusters of entries comprises identifying as clusters groups of entries related to another entry by a determined distance of less than a predetermined first threshold distance.

19. The system of claim 18, wherein the distance is normalized on an interval from 0 to 1, and the predetermined threshold distance is approximately 0.05.

20. The system of claim 15, wherein filtering by at least one of the following comprises:
excluding entries characterized by a minimum distance to nearest entry less than a predetermined third threshold; and
including only entries from a given cluster.

21. The system of claim 15, further comprising:
for at least one result in the ordered list, returning, by one or more computing devices, a link which, when selected, prompts as a response from the online shopping system an ordered list of products in the same cluster as the at least one result.

* * * * *